United States Patent
Stechmann

[11] 3,979,616
[45] Sept. 7, 1976

[54] UNIPOLAR ROTARY STEP MOTOR

[75] Inventor: Helmut Stechmann, Schwenningen, Germany

[73] Assignee: Kienzle Uhrenfabriken GmbH, Schwenningen, Germany

[22] Filed: Feb. 13, 1974

[21] Appl. No.: 442,286

[30] Foreign Application Priority Data
Feb. 19, 1973 Germany.............................. 2308053
Dec. 8, 1973 Germany.............................. 2361217

[52] U.S. Cl................................ 310/49 R; 310/154
[51] Int. Cl.²........................................ H02K 37/00
[58] Field of Search............... 310/49, 40 MM, 178, 310/191, 154, 156, 177, 258, 162, 172, 163, 46, 164, 266; 322/48

[56] References Cited
UNITED STATES PATENTS

| | | | |
|---|---|---|---|
| 2,968,755 | 1/1961 | Baermann............................. | 310/46 |
| 3,469,132 | 9/1969 | Haydon............................... | 310/156 |
| 3,603,826 | 9/1971 | Saretzky............................. | 310/266 |
| 3,845,338 | 10/1974 | Fawzy................................. | 310/266 |

*Primary Examiner*—R. Skudy
*Attorney, Agent, or Firm*—Pollock, Vande Sande & Priddy

[57] ABSTRACT

A unipolar rotary step motor having a polarized rotor which turns step-by-step in response to the magnetic field of a control coil as the coil is periodically pulsed by spaced unidirectional current pulses. The magnetic circuit includes, in addition to a magnetizing coil wound about the stator, a permanent magnet whose polarity of magnetization is opposite to that of the magnetization resulting from the coil. The configuration of the air gap between the stator and the rotor is such that the respective zones or regions of influence of, on the one hand, the permanent magnet alone, and, on the other hand, the combination of the permanent magnet with the magnetization resulting from the control coil, each extend over more than 180° of rotor rotation and thus overlap each other. Each current pulse supplied to the control coil causes a complete rotation of the rotor.

1 Claim, 6 Drawing Figures

UNIPOLAR ROTARY STEP MOTOR

BACKGROUND OF THE INVENTION

The invention relates to a rotary step motor provided with unipolar control. Step motors are used, for example, in clocks or other timekeeping devices and are usually controlled by signals of alternating polarity which flow through a control coil wound about the stator. The resulting magnetic field produces alternating north and south poles periodically in response to the alternating energization. A polarized rotor positioned within the alternating magnetic field is caused to rotate, and the direction of rotation is established by mechanical devices or by a specific shaping of the pole tips of the stator. Rotary step motors of the kind just described, operating in response to signals of alternating polarity, are known as bipolar motors. Their disadvantage is that they require the use of electronic driving circuits of a rather complex nature in order to produce current pulses of alternatingly opposite polarities.

SUMMARY OF THE INVENTION

It is an object of this invention to provide a rotary step motor which can be controlled by a unidirectional current pulse provided by the output of a frequency divider. Thus, the motor of the invention rotates in response to a flow of current of unidirectional polarity through the stator coil. The motor of the present invention provides all of the advantageous features of a bipolar type rotary step motor in the sense that it provides a high degree of efficiency, provides reliable operation over a wide voltage range, and operates without being unduly influenced by the duration of the pulse supplied to the control coil.

Described briefly, the present invention employs a rotor which is located wthin the field of a permanent magnet. The magnetization resulting from the flow of a pulse of unidirectional current through the control coil on the stator is opposite to and stronger than that provided by the permanent magnet. The resulting effect of the zones of influence of the permanent magnet by itself, on the one hand, and the opposing control coil in combination with the permanent magnet, on the other hand, partially overlap each other. As a result, each applied pulse of current to the control coil is effective to produce a complete rotation of the rotor.

BRIEF DESCRIPTION OF THE DRAWINGS

In describing this invention, reference will be made to the accompanying drawings in which.

DETAILED DESCRIPTION OF THE PREFERRED EMBODIMENT

Figure 1:
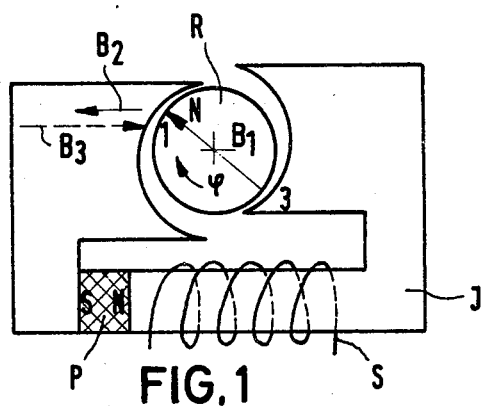
FIG. 1 diagrammatically illustrates the unipolar rotary step motor of this invention.

The rotary step motor of FIG. 1 differs from the customary bipolar type of step motor in that it includes a permanent magnet P. This permanent magnet is included within the stator or yoke J about which is wound the control coil S. The permanent magnet P generates a magnetic bias $B_2$ for the rotor in the forward direction in the absence of any application of a current pulse to the control coil. As a result, the rotor is influenced to assume the position 1 shown in FIG. 1.

It will be noted in FIG. 1 that the configuration of the poles of the yoke is such as to provide an air gap of decreasing width in the direction of rotation. Thus, the gaps $G_1$ and $G_2$ are clearly shown in FIGS. 1, 4A, 4B, and 5 as decreasing in width in the direction of rotor rotation. As a result, the rotor torque produced by the permanent magnet alone varies as a function of the angle $\phi$ as shown by the broken line graphical representation at line B of FIG. 3. The result of this is that the rotor is turned in the direction of the arrow shown in FIG. 2 from any angular position that it may have along the circular arc $K_1$ shown by broken line in FIG. 2 toward the position 1. Thus, the circular arc $K_1$ may be said to represent the effective region or field of influence over the rotor provided by the permanent magnet P in accordance with the specific shape of the poles of yoke J.

Figure 2:
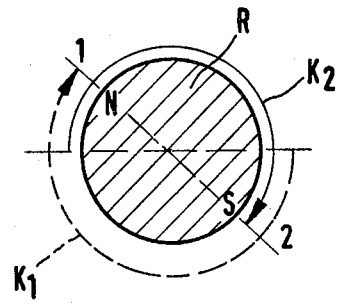
FIG. 2 diagrammatically illustrates the overlapping of the two fields of influence, i.e. of the permanent magnet alone, and of the permanent magnet in combination with the control coil.
Figure 3:
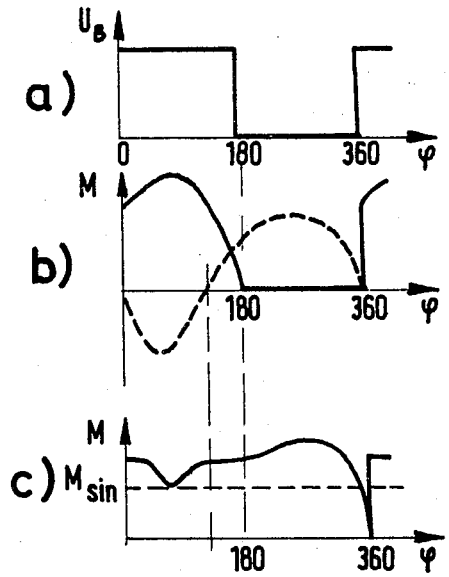
FIG. 3 illustrates various wave forms of current and torque as a function of the angle of rotation of the rotor.

Line A of FIG. 3 illustrates the unidirectional current pulses that are applied to the control coil S. Throughout the duration of each current pulse, a current flows through the control coil to produce a magnetic field $B_3$ of a polarity which is opposite to that of the permanent magnet field $B_2$ produced by permanent magnet P. The intensity of this magnetic field produced by the control coil is such as to overcompensate for the magnetic field produced by the permanent magnet. Thus, when the control coil is energized, to produce the magnetic field $B_3$, the rotor R then assumes a new rest position 2 as shown in FIG. 1. The solid line of FIG. 3, line B, illustrates the variation of the torque of the motor under the influence of such magnetic field $B_3$ as a function of the rotational position of the rotor. With the general configuration of the poles of the yoke as shown in FIG. 1, the corresponding effective region or field of influence provided by magnetic field $B_3$ is shown in FIG. 2 by the solid line designated $K_2$. In other words, the rotor R will be turned in the direction of the arrow of FIG. 1 from any angular position of the rotor within the circular arc $K_2$ toward the position 2.

FIG. 2 shows that the arcs $K_1$ and $K_2$ overlap each other. If the control coil S is energized with current in the manner shown at line A of FIG. 3, the resulting torque on the motor is illustrated at line C of FIG. 3. In response to this torque, the rotor will rotate one full revoluation for every input pulse. FIG. 2 shows that the rotor turns under the influence of the field of coil 3 from the position 1 to the position 2, in which latter position it lies within the field of influence of the permanent magnet. As a result, when the current pulse of energization to coil S terminates, the rotor will then turn under the influence of the field of the permanent magnet from the position 2 back into position 1 and with the same direction of rotation that it had when it turned from position 1 to position 2.

As an alternative to the arrangement specifically illustrated in FIG. 1, the desired magnetic bias can also be accomplished by properly biased yoke laminations.

Figure 4A:
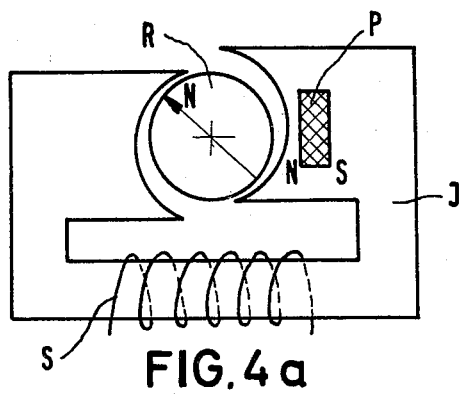
FIG. 4A shows an alternative embodiment of the invention wherein the permanent magnet is in parallel with the electromagnetic field produced by the control coil.
Figure 4B:
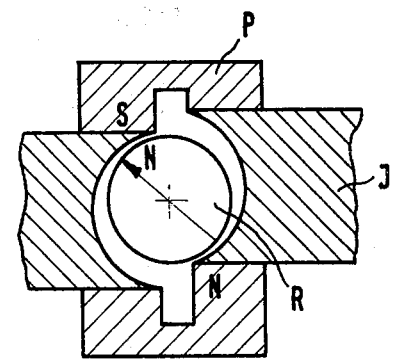
FIG. 4B illustrates an alternative embodiment of the invention where the permanent magnet is in parallel with the electromagnetic field of the control coil.

One disadvantage of the embodiment shown in FIG. 1 is that the magnetic bias is series with the electromagnetic circuit. This will reduce the magnetic conductivity of the electromagnetic circuit, decreasing the transforming efficiency. On the other hand, if the permanent magnet circuit is placed in parallel with the electromagnetic circuit, its efficiency is not impaired. This can be accomplished as shown in FIG. 4A by providing a permanent magnet P at a stator lamination of the yoke J. According to a further embodiment as shown in FIG. 4B, the permanent magnet is placed at the poles of the yoke J and completely surrounds the rotor R.

Figure 5:
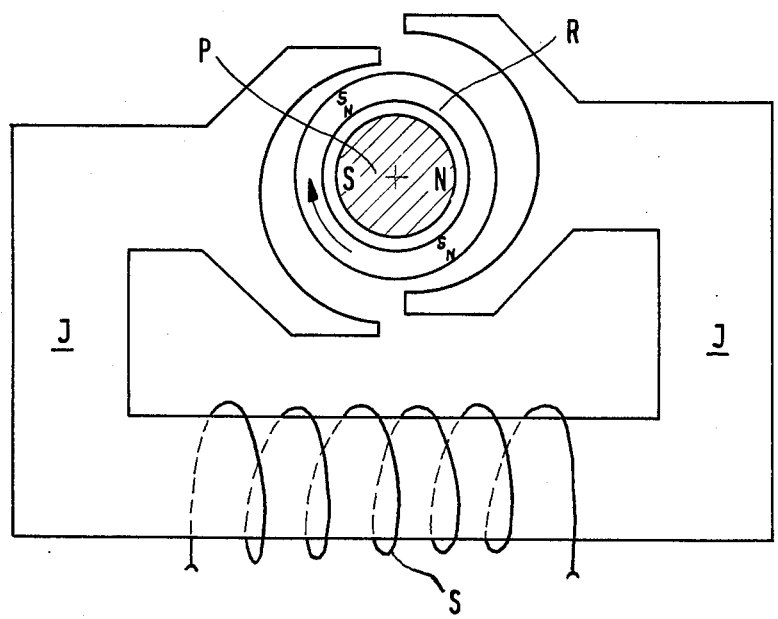
FIG. 5 illustrates a further alternative embodiment of the invention wherein the permanent magnet field is generated by a permanent magnet positioned within the rotor itself.

FIG. 5 illustrates a further embodiment of the invention which is particularly advantageous, not only geometrically but also because the magnetic conductivity of the complete system is not effected by the introduction of the permanent magnet. This is accomplished by using a hollow rotor and by providing a permanent magnet within the hollow space of the rotor.

In FIG. 5, the polarized rotor R rotates between the poles of the yoke J and with the control coil S wound about the yoke. In contrast with the arrangement of the already described embodiments, the rotor R of FIG. 5 has a hollow interior space. In this space, a permanent magnet P is fixedly arranged and suitably aligned. In the specific position, the magnet does not interfere with the magnetic conductivity of the yoke J; nevertheless, this arrangement still does provide the required permanent magnet field at the rotor location. When the control coil S is energized with a current pulse, its magnetic field is opposite to, and overcompensates for, the field of the permanent magnet. When this occurs, rotor R revolves around the permanent magnet by a complete revolution for each current pulse, successive pulses, of course, always being of the same polarity as shown at line A of FIG. 3.

In FIG. 5, the rotor R is of hollow, cylindrical form and the cylindrical permanent magnet is shown as providing two-pole magnetization, but it will be understood that multipolar magnetization may also be provided.

It will be noted that in each of the above-described embodiments, the current flows through the control coil in one direction only, thereby providing a distinct advantage over rotary step motors of the prior art.

What I claim is:

1. A rotary step motor comprising:
   a stator defining an air gap with opposed poles at said air gap,
   a rotor supported for rotation in said stator air gap, said rotor comprising a permanent magnet means and with the air gap between each pole and the rotor decreasing in the direction of rotor rotation,
   a control coil for said stator for magnetizing said stator with one polarity of magnetization in response to each of a succession of unidirectional pulses applied to said control coil,
   said stator defining adjacent said air gap a recess for receiving a further permanent magnet means for magnetizing said stator with a polarity of magnetization opposite to that provided by said control coil,
   said magnetization provided by said control coil when energized by one of said unidirectional pulses being greater than that provided by said further permanent magnet means,
   whereby the application and also the removal of each of a plurality of said unidirectional pulses to said control coil produces a predetermined amount of rotation of said rotor.

* * * * *